United States Patent [19]
Hamdy-Swink

[11] Patent Number: 5,901,284
[45] Date of Patent: May 4, 1999

[54] METHOD AND SYSTEM FOR COMMUNICATION ACCESS RESTRICTION

[75] Inventor: Kathryn Anne Hamdy-Swink, Alpharetta, Ga.

[73] Assignee: BellSouth Corporation, Atlanta, Ga.

[21] Appl. No.: 08/665,823

[22] Filed: Jun. 19, 1996

[51] Int. Cl.⁶ .................................................. H04L 9/00
[52] U.S. Cl. .................. 395/186; 395/187.01; 380/25; 340/825.32
[58] Field of Search ............................ 395/186, 187.01, 395/188.01, 606, 726, 732; 364/286.4, 286.5; 340/825.31, 825.32; 380/4, 23, 25

[56] References Cited

U.S. PATENT DOCUMENTS

| | | | |
|---|---|---|---|
| 4,590,470 | 5/1986 | Koenig | 340/825.31 |
| 4,720,860 | 1/1988 | Weiss | 380/23 |
| 5,003,595 | 3/1991 | Collins et al. | 380/25 |
| 5,113,499 | 5/1992 | Ankney et al. | 395/325 |
| 5,168,520 | 12/1992 | Weiss | 380/23 |
| 5,237,614 | 8/1993 | Weiss | 380/23 |
| 5,276,444 | 1/1994 | McNair | 340/825.33 |
| 5,301,246 | 4/1994 | Archibald et al. | 380/23 |
| 5,361,062 | 11/1994 | Weiss et al. | 340/825.33 |
| 5,451,757 | 9/1995 | Heath, Jr. | 235/382 |
| 5,479,512 | 12/1995 | Weiss | 380/28 |
| 5,481,611 | 1/1996 | Owens et al. | 380/25 |
| 5,485,519 | 1/1996 | Weiss | 380/23 |
| 5,497,411 | 3/1996 | Pellerin | 379/59 |
| 5,510,777 | 4/1996 | Pile et al. | 340/825.31 |
| 5,560,008 | 9/1996 | Johnson et al. | 395/650 |
| 5,572,193 | 11/1996 | Flanders et al. | 340/825.34 |
| 5,764,756 | 6/1998 | Onweller | 379/242 |

OTHER PUBLICATIONS

"ACE/Server: Undefeatable Security for Enterprise Network Environments", Security Dynamics Technologies, Inc., Cambridge, Massachusetts, ©1995 Security Dynamics Technologies, Inc. 102 15M Nov. 10, 1995.

"Securing the Information Age . . . Minute by Minute", Security Dynamics Technologies, Inc., Cambridge, Massachusetts, ©1996 Security Dynamics Technologies, Inc. 101 5M Feb. 16, 1996.

Sullivan, John, "Southwestern Bell Introduces AIN–Based Computer Security Service", *Advanced Intelligent Network News*, Apr. 17, 1996, p. 8.

"Southwestern Bell Introduces 'Padlock' for PCs",*Today's News*, SBC Communications, Inc. and its Southwestern Bell Companies, St. Louis, Missouri, Apr. 5, 1996.

*Primary Examiner*—Dieu-Minh T. Le
*Attorney, Agent, or Firm*—Jones & Askew, LLP

[57] ABSTRACT

A network-based telecommunications system and method that restricts the dial-in access to a resource of a subscriber to only a communication from an authorized user of the resource. A switch receives a communication directed to a subscriber from a calling party. Prior to connecting the communication to the terminating equipment associated with the subscriber, the switch requests processing information. An authentication unit determines whether the calling party is an authorized user by checking whether a passcode provided by the calling party corresponds to a passcode being held by the authentication unit. If the passcode corresponds, then the authentication unit identifies the calling party as an authorized user, and the communication then may be connected to the terminating equipment of the subscriber. If the passcode fails to correspond, then the authentication unit fails to identify the calling party as an authorized user. The communication is not connected to the terminating equipment of the subscriber.

25 Claims, 5 Drawing Sheets

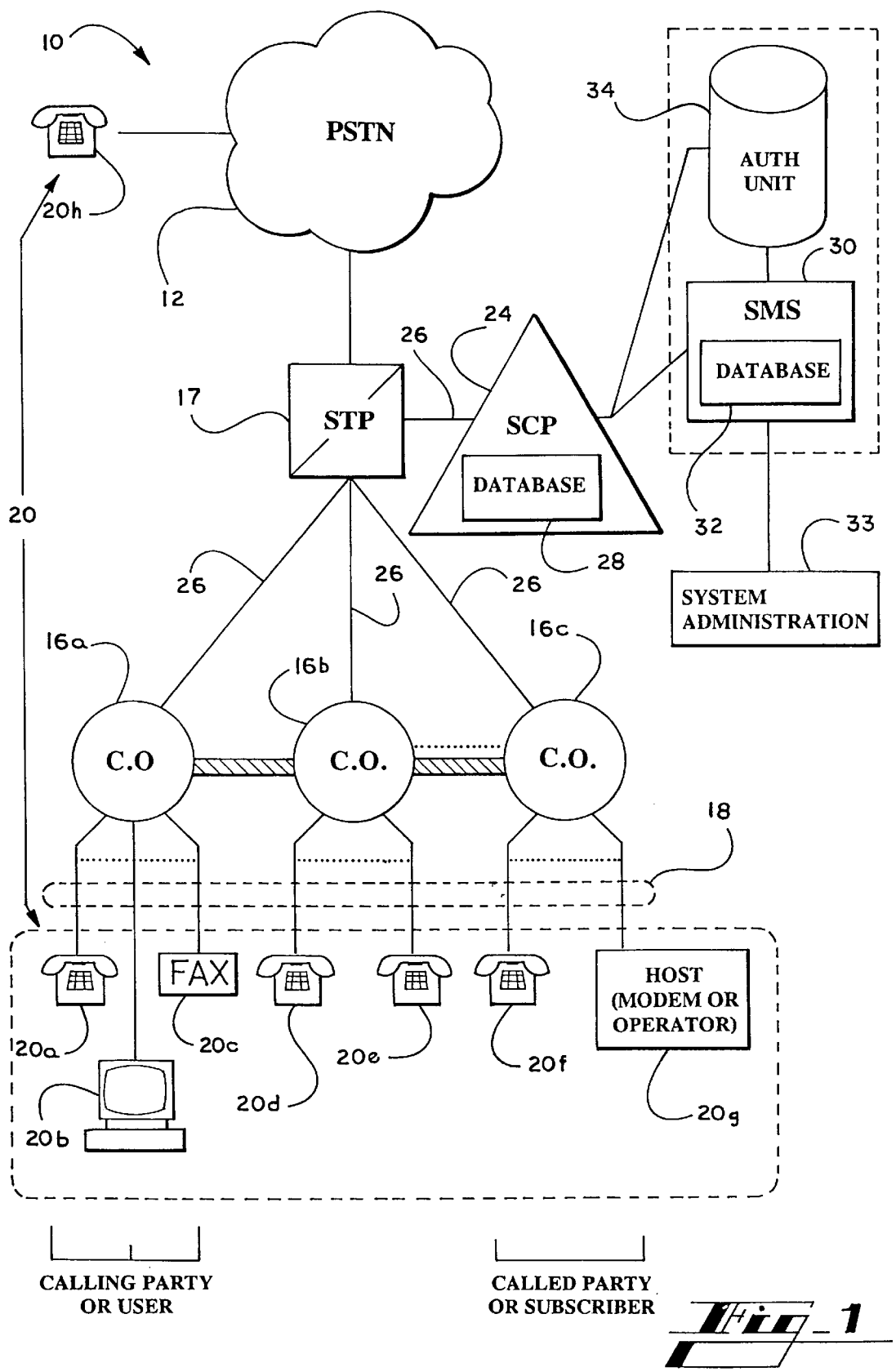
Fig_1

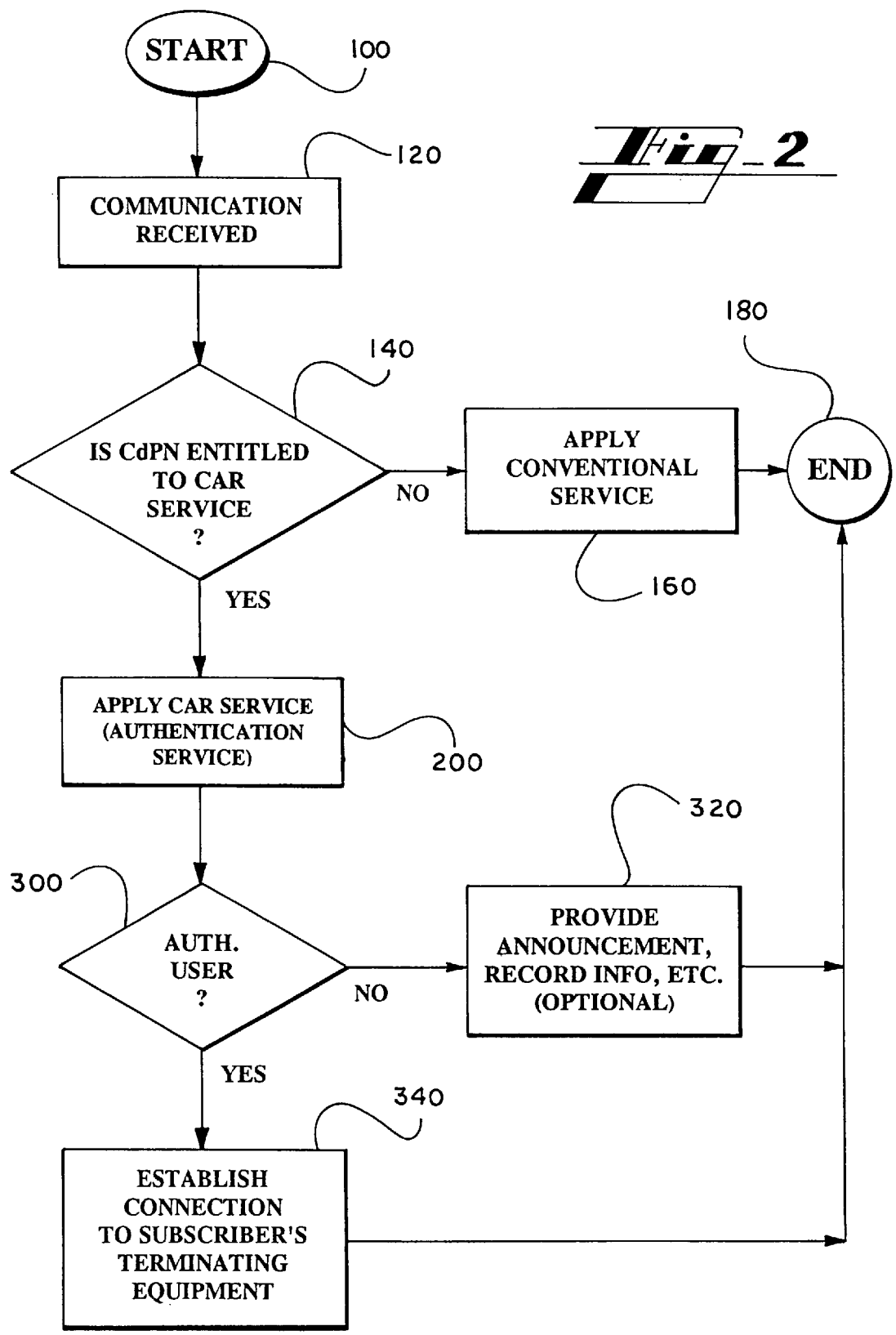
Fig_2

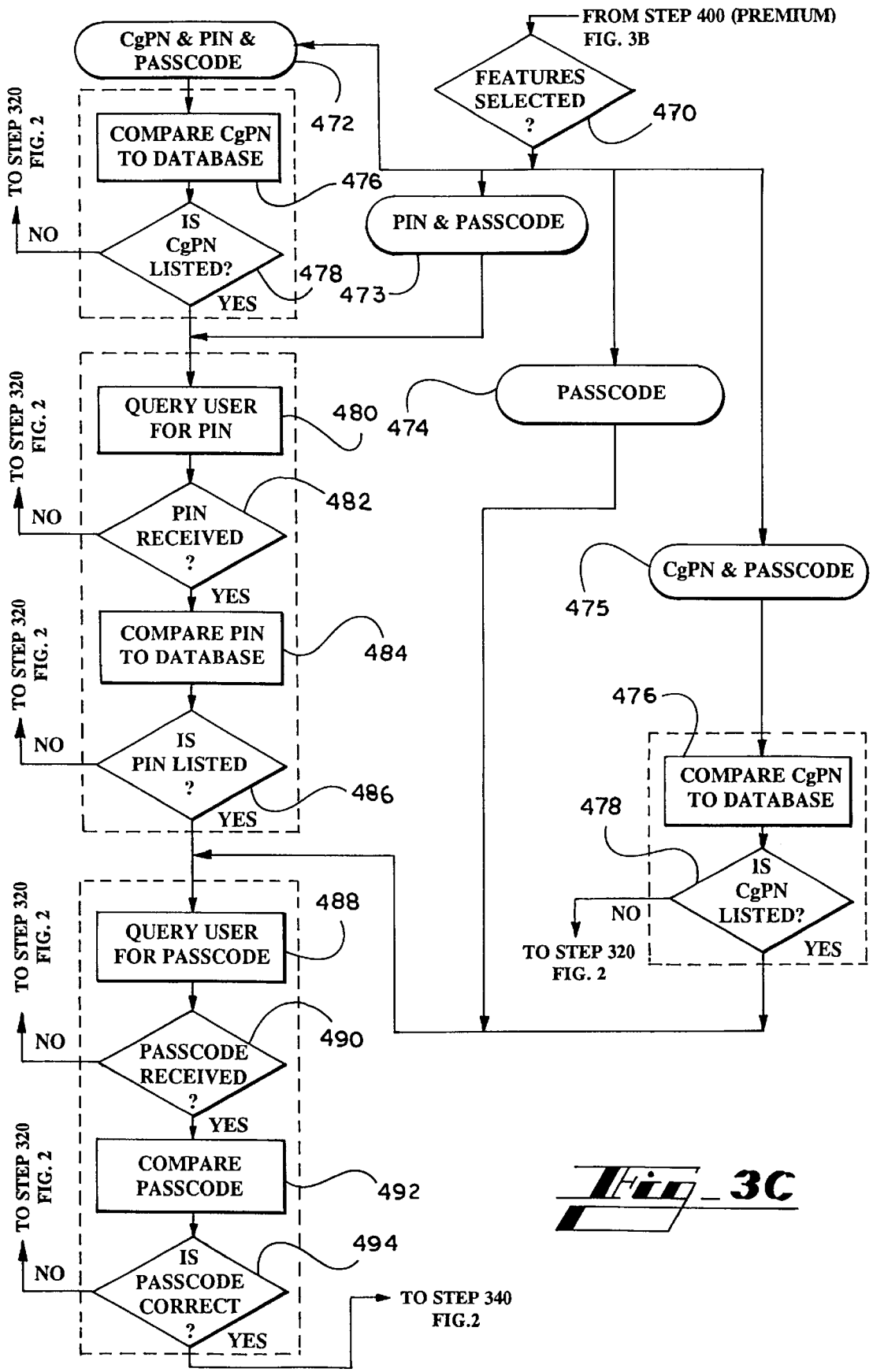

METHOD AND SYSTEM FOR COMMUNICATION ACCESS RESTRICTION

TECHNICAL FIELD

The present invention relates to the field of security systems for restricting access to resources of a subscriber such as computer resources, and more particularly, relates to a method and system based in the telecommunications network of restricting the access of certain voice and data communications to a subscriber's terminating equipment, and hence, to a subscriber's resources.

BACKGROUND OF THE INVENTION

In parallel with the recent growth of the use of computer resources has been the growth in number and in sophistication of those untoward individuals seeking to impermissibly access and exploit such computer resources. Recent studies indicate that in 1995 one in five companies have suffered break-ins into their computer resources, 80% have hired information security officers, and 45% have determined that restricting access to computer resources is a critical problem.

The restriction of access to computer resources is made more difficult by the fact that many institutions such as businesses, schools, and universities find it useful and often necessary to allow remote access to their computer resources. Typically, such remote access allows a user to connect to an institution's computer resources through use of the public switched telephone network. For example, a salesperson "on the road" may find it necessary to communicate with the computer resources of the home office to obtain the most recent price list. Or, for example, a university student may be required to remotely register for classes through communication with the university's computer resources. Typically, a user, such as the salesperson or university student, who wishes to access such computer resources does so in the same general fashion as if the user were making a telephone call. In fact, a communication from a device through the public switched telephone network that seeks to access computer resources is treated very much like a conventional telephone call. Of course, rather than voice communications, data is exchanged between the device (such as a computer) used by the user (calling party) and the device that houses the computer resources of the host (called party).

Allowing for remote access to computer resources increases the difficulty in restricting access to such computer resources. The difficulty increases because remote access does not allow for any direct control or inspections of the user as could be provided with on-site access. For example, the salesperson may be allowed to access the company's computer resources only through a designated computer, such as the computer in the boss's office. Or, for example, a university student may be required to show a photographic identification card to a security guard before the student is allowed to use a computer on-site in the university's computer laboratory to register for classes. With remote access to computer resources and without any security restrictions, practically any person with a minimum amount of information may use a modem and computer to dial-in to a computer resource.

It was quickly recognized by hosts that their computer resources needed guarding and that access restrictions to the computer resources, especially remote communication access restrictions, had to be put into place. Early, it was recognized by telecommunication service providers and hosts that the access restriction service offered by service providers could be used as a system to restrict communication access to computer resources. Access restriction services may include services such as call blocking. An access restriction service allows a subscriber to specify the calling party number(s) (CgPNs) from which the subscriber will accept communications. The list of CgPNs is usually maintained in a database managed at an advanced intelligent network element such as a service control point (SCP) within the public switched telephone network. Every communication over the switched telephone network is evaluated for determination as to whether the called party number (CdPN) is associated with a subscriber to the access restriction service and, if so, whether that particular CgPN is allowed access to the subscriber's line. If the CdPN is associated with a subscriber to the service, and if the CgPN is listed in the database, the communication is terminated to the device associated with the CdPN of the subscriber. If the CgPN is not authorized to access the device associated with the CdPN, the communication is generally disconnected.

For certain applications, the access restriction service provides an adequate measure of security. For many others, though, this access restriction service is inadequate. The inadequacy of the service has given rise to the development and implementation of additional or other security systems with respect to restricting access to computer resources. One such security system for communication access restriction is a code system such as a personal identification number (PIN) or password system. In a PIN system, a host's computer includes or is associated with a database that includes entries of PINs corresponding to authorized users of the guarded computer resources. To remotely access a computer resource with a PIN system, a user places a call to the computer resource. The call is "answered" by the computer resource (or affiliated device). The user then is requested or prompted to input a PIN. If the PIN matches an entry in the authorized PIN database, then the user is provided with access to the computer resource. If the PIN does not match, then the computer resource "hangs up" on the user. In other words, the computer resource disconnects itself from the completed communication by which the user was attempting to remotely access the computer resources.

Another type of security system that is in use is a caller-identification (Caller-Id) system. In this system, a user calls a CdPN associated with the host and the calling line number (CgPN) that is being used for the communication is collected by the host's device or some other device. This CgPN is compared to entries in a database. If the CgPN matches an entry in the authorized database, then the user is provided with access to the computer resource. If the CgPN does not match, then the computer resource "hangs up" on the user. In other words, the computer resource disconnects itself from the completed communication through which the user was attempting to remotely access the computer resource.

Yet another type of security system that is in use is a call-back or response system. In a call-back system, a user calls a CdPN associated with the host and the host's device collects certain information with respect to the user. A piece of information that may be collected is the CgPN. The call-back system then disconnects itself from the communication. As its name implies, the call-back system may return the call to the user based upon the information that was collected or previously stored, that was compared to database entries and query responses, and that resulted in a telephone number that is used by the call-back system to place the return call. This number may be preselected or may be the CgPN. If the information does not match or check out, the system does not return the call.

In addition to the above described systems, there are other security systems for restricting access to a subscriber's resources. These other systems include voice or fingerprint authentication as part of the restrictions to assure that only authorized users access a subscriber's resources.

All of these security systems have limitations. Most notably, the use of a PIN, CgPN or CdPN to restrict communication access to computer resources is ineffective against so-called "hackers". A hacker may possess and implement any number of methods or devices for discovering an authorized PIN, CgPN or CdPN and for improperly gaining access to computer resources.

Additionally, as noted, in the above described systems except the call block service, the communication from the hacker is "answered" by the computer resource or associated device. This "answer" takes place whether or not the communication is an authorized communication or placed by an authorized user. In other words, before the authority of the calling party has been determined, the communication has been connected over the subscriber's line to a device associated with the subscriber's resources. Thus, the hacker is, at the time of receipt of the communication by the computer resource, already on the "doorstep" of the computer resource. An unauthorized communication is able to access the periphery of the very resource from which the communication is to be shielded even before the communication can be identified as unauthorized. This access to the "doorstep" of the computer resource increases the possibility of unauthorized access to the computer resource. It may not take much effort for the hacker to push the door open.

As noted above, these referenced security systems may pose few obstacles to a hacker. But, on the other hand, these security systems may pose significant obstacles to authorized users. Generally, these obstacles take the form of inconvenience and inefficiency. For example, the PIN, CgPN or CDPN of an authorized user may not be entered in the authorized user database. As another example, it may take an inordinate amount of time to accomplish entry and query of an authorized user's relevant information in a database. A salesperson may call into the home office's computer resource. In response to a prompt, the salesperson enters his/her PIN, but the PIN is rejected. The salesperson is frustrated in his/her efforts to access the computer resource. Valuable time, effort and money is wasted. Further, to avoid wasting time and money, the salesperson may take steps to remove or circumvent the security restrictions, thereby making it easier for unauthorized users to access the computer resources.

A further limitation of these referenced systems is that they tie up telecommunication resources that may be put to other uses. These referenced systems may also inordinately delay processing of the communication placed by the user and those communications placed by others. For example, if a host uses a caller identification system to screen customers who call for access to computer resources, the caller identification system generally requires a customer to wait for two rings until the caller identification is transmitted. During this time and during the transmission time of the caller identification, the telecommunication lines and the host's device are tied up in order to perform the caller identification screen. This processing takes about fifteen seconds per call. For a host with a lot of calls to its computer resources, fifteen seconds multiplied by a lot of calls adds up to a lot of time lost and to a lot of equipment being tied up.

In addition to these operational limitations, security systems such as the PIN and other systems are costly. The high cost of such systems derives from several factors. One such factor is the high cost of equipment necessary to implement such a system. An entity desiring to avail itself of the protection afforded by one of these systems must purchase equipment capable of some or all of the following steps: detecting and answering an incoming communication; putting the communication on hold; prompting the calling party (user) to enter a PIN (or other information); comparing the input by the calling party to the authorized entries maintained in a functionally connected database; and then either connecting or disconnecting the communication depending on the results of the comparison. These functions may be performed by a device known to those knowledgeable in the art as a communications access server. Such devices are available, though at a cost of tens of thousands of dollars.

A communications access server generally requires both database management and equipment maintenance. Therefore, an entity that desires to acquire and operate any of the referenced systems must also allocate employees to be trained on both operation and maintenance requirements. Many companies, particularly small and medium-sized ones, are unable to afford (or simply want to avoid) such an outlay of capital expense and valuable employee resources. To many of these companies, unknown and unquantifiable future losses resultant from unauthorized access to computer resources are preferable to large, quantifiable outlays of financial and employee resources. Smaller companies have truly been hooked on the horns of a distressing dilemma.

Within the past several years, security-related problems with communication access restriction have been addressed by the development and commercial availability of many products, one of which is a product known as the ACE/Server system by Security Dynamics Technologies, Inc., Cambridge, Mass. Generally, the ACE/Server system is a system for the electronic generation and comparison of non-predictable codes and for the comparison of PINs for the purpose of identification of authorized users. The ACE/Server system is operated in conjunction with a "token" such as that which is available commercially under the trademark SecurID®, also from Security Dynamics Technologies, Inc. A "token" is a device which is usually portable and/or personal, but is not limited to being either. A token stores machine and/or visually readable data which is usually secret. Examples of tokens include a credit card, a smart card, a photooptical data storage card, a floppy disk, touch-memory button, data key, processor memory component (i.e., RAM, ROM, electronically alterable memory), other data-containing electronic component, other data-containing IC chip, or the like. A token is also referred to as a token card. In the Ace/Server system, the SecurID® token generates a six digit passcode that changes every sixty seconds to another, randomly selected, nonpredictable six digit passcode. Although a passcode in the described Ace/Server system comprises six digits, the term "passcode" as used herein should not be so limited. Rather, the term "passcode" is used herein to denote any password, secret code, PIN, prose phrase, alpha-numeric code, or other code which may be stored and/or displayed on a token, which may be stored and/or displayed at an authentication unit, and which may be used as part of an authentication system to verify a calling party as an authorized user of a subscriber's resources. Both the timing of the change in the passcode and the passcode itself are synchronized with the access control module (ACM) of the ACE/Server system so that, at any given moment, for any given authorized user, the passcode momentarily reflected on the SecurID® token is recognized by the ACE/Server, at that corresponding moment, as the correct passcode for that particular authorized user. The ACE/Server also stores authorized PINs and compares received PINs for access authorization. A PIN may be incorporated as part of the passcode that is transmitted by the user of the token. The Ace/Server includes information to decode the PIN from the passcode and/or other information that is transmitted from the user as a result of attempts at establishing access with the subscriber's resources through the use of a token. A token that uses an embedded combination of the user's PIN and a passcode is sometimes referred to as a "PINPAD card".

To explain the general operation of the ACE/Server system, assume that the home office of the above-mentioned salesperson is equipped with an ACE/Server system in order to protect the home office's computer resources. In particular, the ACE/Server system (by hardware of software implementation) is connected to the home office's computer resources such that the ACE/Server system may be used to screen access to the computer resources. The ACM of the Ace/Server system may reside at a host, operating system, or network/client resource of communications device. The salesperson is provided with a SecurID® token and a PIN that the salesperson memorizes. Alternatively, the PIN may be incorporated as part of the passcode generated by the token. To remotely access the computer resources of the home office, the salesperson dials the appropriate CdPN of the home office. The call is answered at the home office. In response to prompts provided by the ACE/Server system, the salesperson enters his/her PIN and also enters the passcode that appears on the face of the SecurID® token. The ACE/Server system checks whether the PIN is an authorized PIN, and checks whether the passcode corresponds to the appropriate passcode as maintained in synchronicity by the ACE/Server. If the checks are positive, then the ACE/Server allows the salesperson to access the computer resources. If either of the checks are negative, then the ACE/Server hangs up on the salesperson.

Further information describing the general operating features of the ACE/Server system including the SecurID® token are available in the brochures entitled: "ACE/Server: Undefeatable Security for Enterprise Network Environments", Security Dynamic Technologies, Inc., ©1995 Security Dynamics Technologies, Inc. 102 15M Nov. 10, 1995; and "Securing the Information Age. Minute by Minute", Security Dynamic Technologies, Inc., ©1996 Security Dynamics Technologies, Inc. 101 SM Feb. 16, 1996. These brochures are incorporated by reference herein, and can otherwise be obtained from Security Dynamics Technologies, Inc., One Alewife Center, Cambridge, Mass. 02140. Both the ACE/Server system and SecurID token are discussed in further detail in the U.S. Pat. No. 5,168,520 to Weiss, which patent is also incorporated herein by reference. Other security systems that make use of a passcode generated by a token are referenced or described in the following patents, which are also incorporated herein by reference: Weiss, U.S. Pat. No. 5,485,519; Weiss, U.S. Pat. No. 4,720,860; and Weiss et al., U.S. Pat. No. 5,361,062.

When the ACE/Server system and SecurID® token are implemented interactively, they provide a defensive perimeter immediately around computer resources equipped with the ACE/Server system. Nonetheless, the ACE/Server system includes many of the same limitations of the other communication access restriction systems. As with the other systems, a communication to a computer resource that uses the ACE/Server system is "answered" by the computer resource or affiliated device. Thus, the calling party is, as early as the time of receipt of the communication, already on the "doorstep" of the computer resource. As noted, it may not take much effort for the calling party to push the door open. An additional limitation of the ACE/Server system is that it may pose the same types of obstacles to authorized users as do other referenced systems.

And a further limitation of the ACE/Server system is that it is costly in that it requires the purchase, installation and maintenance of appropriate hardware and software. It also requires the time and effort of individuals to learn how to use the ACE/Server system at the home office and "on the road", and to learn how to maintain and update the ACE/Server system as necessary for its efficient and economical use in the protection of computer resources. In particular, for a subscriber to upgrade the level of security of computer resources by adding a security server such as the ACE/Server or similar server, any or all of the following steps and costs may be involved: adding a computer; selecting and purchasing a dial-back security server software/hardware package; purchasing SecurID® (or similar) tokens; learning how to use the new security server application; distributing software that works with the new security server; training users to use the new security server; utilizing part of a computer resource to support and maintain the new server; and adding modems to the communications server designating them as dial-out only modems; and upgrading software to support the additional modems.

The foregoing discussion of the problems associated with security issues relating to remote communication access to computer resources has been focused on the need to guard such computer resources against exploitation and misuse. However, another issue with respect to remote communication access to computer resources is the maximization of a host's resources or equipment such that the host may better serve authorized users. In other words, a host may be deluged with calling parties who attempt to access the host's computer resources. Only some of this deluge may be authorized users. The host is burdened with the task of separating the wheat from the chaff in its process of determining the identity of authorized users and of providing them with access. The host generally carries this burden by purchasing, using and maintaining specialized equipment or by dedicating part of its computer resources to the process of screening authorized users. Either of these solutions cuts into the number and function of the resources that the host may bring to bear in serving users. Further, a host may have to employ additional employees to set up, maintain and run a security service with respect to the restriction of access to computer resources to only authorized users.

Accordingly, with respect to telecommunication service systems, there is a need for a system which provides greater security of computer resources. Such a system would be available at an affordable cost to those who desire such protection. For instance, there is a need for a system which eliminates the requirement for the host to purchase, operate and maintain costly security devices.

There is an additional need for a system which provides greater security of computer resources by determining whether an incoming communication is authorized to access those computer resources before accepting the attempted communication into the periphery of those computer resources at the host site.

There is yet a further need for a system which maximizes a subscriber's computer and other resources in the service of authorized users rather than in the screening of authorized users.

SUMMARY

In general, the present invention provides a method and system for restricting communication access to a subscriber's resources, whether the resources are voice or data resources. More particularly, the present invention provides a method and system based in the telecommunications network of restricting the access of certain voice and data communications to a subscriber's terminating equipment, and thereby restricting the access of certain communications to a subscriber's resources. The communication access to a subscriber's resources is restricted to authorized users. A communication is not connected to a subscriber's terminating equipment until the calling party associated with the communication is authenticated or is otherwise determined to be an authorized user.

In the preferred embodiment, authentication is accomplished by verification of a combination of security elements including the calling party number (CgPN) from which the communication originates, a personal identification number (PIN), and a passcode. To obtain connection of the communication to the subscriber's terminating equipment, all three of these security elements (CgPN, PIN and PASSCODE) must correspond to an authorized user. Other embodiments of the present invention provide for the authentication of a calling party based on other security elements, or on different combinations of fewer or more security elements. The authentication is preferably carried out by or in association with an authentication unit that is included as part of or connected to an element of the advanced intelligent network.

In particular, the preferred embodiment determines that a calling party is an authorized user by checking for certain security elements, and specifically, by checking that the passcode provided by the calling party corresponds to a passcode held at or reviewed by an authentication unit. Preferably, the calling party inputs a passcode that the calling party reads from a token that has been provided by the subscriber. The token generates a passcode on a non-predictable basis. The token's generation of a passcode (timing and content) is synchronized or otherwise corresponds to information such as a corresponding passcode that is held at or in association with an authentication unit. This authentication unit, in turn, is maintained at or in association with an element in the advanced intelligent network. In this manner, upon receipt of the passcode from the calling party, the advanced intelligent network is used to check the authority of the calling party through use of an authentication unit.

Another embodiment of the present invention provides a method and system by which a subscriber may selectively identify which combination of available restriction services, elements or features to implement in connection with a communication access restriction service that is provided through the advanced intelligent network. A subscriber is further able to establish different access requirements for different groups of authorized users entitled to different levels of access. Such selections are made from the host site and are easily changeable to accommodate changing security needs of the subscriber.

Advantageously, the present invention provides subscribers with highly secure protection for their telephonically accessible resources. The extent and types of such protection can be modified or expanded to suit evolving needs. Furthermore, the invention eliminates the necessity for subscribers to purchase, maintain and train employees on the use of costly authentication equipment and software. Instead, such equipment is owned, operated and located on the site of the telecommunication service provider, which bears the responsibility for system operation and maintenance. A subscribers need only provide information to its telecommunication service provider regarding individuals who are authorized access to the subscriber's resources. This increases the availability of such communication access restriction services to small and medium-sized companies who were previously either unwilling or unable to afford the significant costs of purchase and maintenance of previous systems.

Another advantage of the present invention is that it provides improved work flow by minimizing the amount of time that it takes to process a communication to a host and by minimizing the use of equipment in such processing. To illustrate, it was explained in the background that a caller-identification screening system takes about fifteen seconds to process a communication and that during these fifteen seconds the host's equipment is tied up. In contrast, with the preferred embodiment of the present invention, the total initial processing and screening time may be reduced to as little as eight seconds. This is a time savings of seven seconds per call.

As previously discussed, the present invention does not connect the communication to the host's device until the communication has been determined to be from an authorized user. Thus, the subscriber's equipment is not put to use until it is determined that a communication is authorized. This maximizes the use of the subscriber's equipment to service authorized users, rather than to screen for authorized users. By maximizing the use of the subscriber's equipment for authorized users, a subscriber is able to handle more of the authorized user calls.

Yet another advantage of the preferred embodiment is that it records and provides a record of communication attempts from calling parties who are denied access to the protected resources. Such capability is of great benefit to subscribers in identifying sources of attempted break-ins and in taking affirmative measures to prevent the compromise of such restricted-access computer resources. Yet other advantages will be apparent to the careful reader.

Therefore, it is an object of the present invention to provide a method and system for restricting communication access so as to provide greater security of a subscriber's resources.

It is also an object of the present invention to provide a telecommunications network-based method and system for restricting communication access to a subscriber's resources.

Further, it is an object of the present invention to provide a method and system for restricting communication access to a subscriber's resources such that an unauthorized communication is prevented from being completed to the subscriber's terminating device.

It is an additional object of the present invention to provide a method and system for restricting communication access to a subscriber's resources at an affordable cost.

It is a further object of the present invention to provide a method and system for restricting communication access to a subscriber's resources such that the necessity of the purchase, operation and maintenance of costly security systems or devices is eliminated.

It is yet another object of the present invention to provide a method and system for restricting communication access to a subscriber's resources such that the method and system is easy and economical to learn and to use.

It is still a further object of the present invention to provide a method and system which maximizes a subscriber's computer and other resources in the service of authorized users rather than in the screening of authorized users.

It is yet another object of the present invention to provide a record of communication attempts from parties who are denied access to the subscriber's system for the purpose of identifying and tracking attempts by unauthorized callers to access restricted resources.

That the present invention meets these objects will be appreciated from the following description of various embodiments of the present invention.

BRIEF DESCRIPTION OF THE DRAWINGS

FIG. 1 is a block diagram of the preferred environment of the preferred embodiment of the present invention.

FIG. 2 is a flow chart illustrating the general method of the preferred embodiment.

FIGS. 3A–3C provide a flow chart illustrating additional detail to the method of the preferred embodiment in the application of a communication access restriction service.

DETAILED DESCRIPTION

Figure 3A:
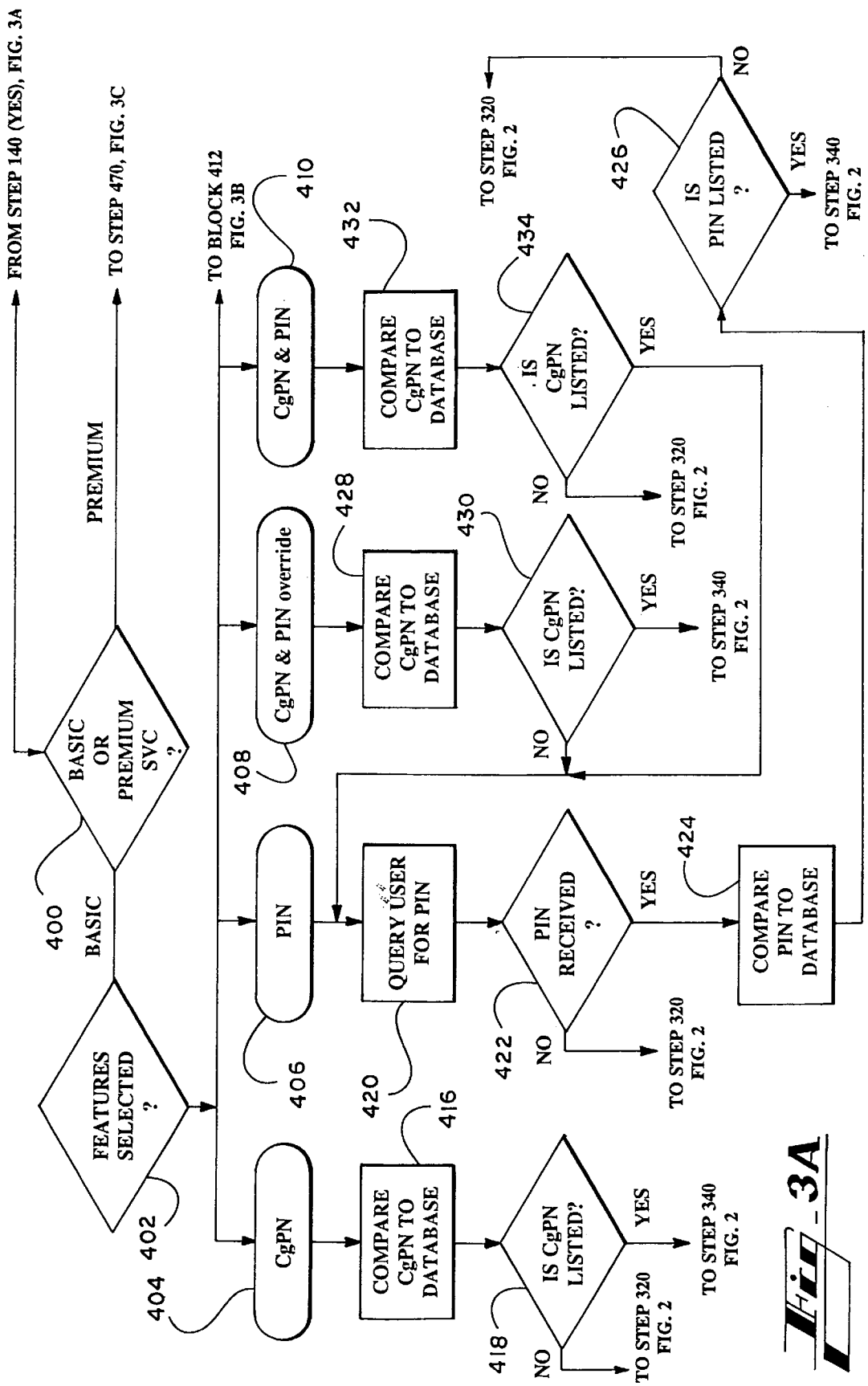

Generally stated, the present invention is a method and system for providing security restrictions with respect to a communication that is being used by a caller in an attempt to gain access through the public switched telephone network to resources associated with the called party of the communication. Such resources may include telephone lines or computer resources of the subscriber. The security restrictions are implemented in telephone network elements, and preferably, in Advanced Intelligent Network (AIN) elements of the public switched telephone network. Advantageously, implementation of the security restrictions in the AIN suspends processing of the communication in the AIN while the authority of the caller is being checked. In this manner, the communication is not connected to the called party's terminating device unless the communication is an authorized communication. By preventing connection of an unauthorized communication to a called party's terminating device, the chances of a security breach with respect to the called party's resources are significantly reduced.

Still generally stated, the present invention preferably includes multiple layers of security restrictions that are implemented in the AIN before the communication is completed to the called party.

These security restrictions include measures to check whether the caller initiating the communication is an authorized user of the subscriber's resources. In the present invention, the authority of a user may be checked through the verification of one or a combination of security elements as is described in detail below in connection with FIGS. 3A–3C. Preferably, the authority of a user is checked through the verification of one or a combination of the following: a calling line number (CgPN); alternate calling number (Alt. CgPN); a personal identification number (PIN); CgPN, Alt. CgPN or PIN overrides; and/or a passcode. The check is conducted through the use of AIN elements including special databases or servers while the processing of the communication is paused or suspended. Advantageously, these multiple layers of security restrictions significantly reduce the chances of an unauthorized communication being connected or established (or as used in telephony terms: "terminated") to a subscriber's terminating device, and thereby reduce the chances of a security breach with respect to the called party's resources. For a better understanding of the present invention, a brief description of the preferred environment of the preferred embodiment is hereinafter provided.

The Preferred Environment of the Preferred Embodiment

Referring now to the drawings, in which like numerals indicate like elements throughout the figures, FIG. 1 is a diagram of the preferred environment of the present invention. The preferred environment is a telecommunications system 10 that includes the public switched telephone network (PSTN) 12 with Advanced Intelligent Network (AIN) elements as described generally in the Background section of U.S. Pat. No. 5,430,719 to Weisser, Jr., which patent is incorporated by reference herein. The salient features of the telecommunications network pertinent to the present invention including elements 16, 17, 24, 28 and 30 have been drawn separately from and connected to the illustrated PSTN 12. This separation is for ease of explanation, and these elements should be regarded as elements of the public switched telephone network 12.

The Public Switched Telephone Network

In the preferred embodiment, the public switched telephone network 12 contains Advanced Intelligent Network (AIN) elements of a typical local exchange carrier. The Advanced Intelligent Network comprises a plurality of end or central offices, which are indicated as end offices 16a, 16b and 16c in FIG. 1. Preferably, each end office includes an "SSP", which is an acronym for a service switching point. A service switching point is a switch, and the terms "end office", "central office", "switch", "service switching point" and "SSP" are used interchangeably herein unless a distinction is noted. In the preferred embodiment, the service switching point is equipped with AIN software release 0.1 or higher release. For more information, see BellCore Specification TR-NWT-001284 Switching Systems Generic Requirements for AIN 0.1, which is also incorporated herein by reference. The broken line between the end offices 16a, 16b and 16c indicates that the number of end offices is arbitrary. An SSP switch includes intelligent network functionality including appropriate hardware and software so that, when a set of predetermined conditions are detected, the SSP initiates a trigger for a predetermined state of a call on a subscriber's directory number, generates the trigger as an appropriate message in the form of a query to be sent out over the telecommunications network, and suspends handling of a call until the SSP receives a reply from the network instructing the SSP to take certain action. If the SSP fails to receive instructions within a certain amount of time, the SSP has a default task to execute with respect to the predetermined condition. A non-SSP switch can generate certain rudimentary signaling over the network, but the non-SSP switch must rely on other equipment to provide subscriber lines connected to such a non-SSP switch with more complex features and services available in the Advanced Intelligent Network.

As further illustrated in FIG. 1, SSPs 16a, 16b and 16c have a plurality of subscriber lines commonly designated as 18 connected thereto. Each subscriber line 18 is connected to a piece of terminating equipment commonly designated as 20a–h. Further, each subscriber line 18 is of a type that is appropriate for the connection of its associated terminating equipment to the public switched telephone network, and in particular, for the connection to an SSP. The illustrated terminating equipment includes telephones 20a, 20c, 20d, 20e, 20f and 20f as well a computer 20b, fax machine 20c, and a host (modem or operator) 20g. As used herein, the host 20g includes a terminating device or terminating equipment to allow a communication to be terminated (connected or established) to the host's equipment such as computer resources associated with the host. This terminating device may include a modem or an operator. Those skilled in the art will understand that the terminating equipment may include other non-illustrated telecommunication or ISDN units or devices such as cellular telephones, wireless units, voice mail systems, answering machines, and other devices, and appropriate lines connecting the telecommunication devices to the public switched telephone network. More particulars regarding terminating devices are provided in connection with the definitions of "calling party" and "called party" provided below.

The telecommunication devices 20a, 20b and 20c are designated as corresponding to the calling party or user. The term "calling party" is used herein generally to refer to the person or device that initiates a communication. The calling party may also be referred to herein as "caller", as "source", and as "user" or "end-user". In some cases, the calling party may not be a person, but may be a device such as a telecommunications device including a facsimile machine, answering service, computer with modem, etc. In the example provided herein, a user is typically a person who uses a telephone to call a called party or who uses a device such as a computer to call a called party so as to access through the PSTN the computer resources of the called party.

The telecommunication devices 20f and 20g are designated as corresponding to the called party or subscriber. The term "called party" is used herein generally to refer to the person or device that answers or responds to the call or communication from a calling party. The term "subscriber" is also used synonymously herein to refer to the "called party" unless a difference is noted. Of course, the called party need not necessarily be the subscriber of the service, nor the party nor device whom the caller is trying to reach. The term "subscriber" is used because a person, company or other institution typically pays for the services provided pursuant to the present invention. As noted above, the terminating device associated with a subscriber may include a telephone, computer with modem, and host, as well as a local area network (LAN) or LAN modem, network facility modem banks, or modem pools, and similar devices or equipment as will be well known to those skilled in the art of remote access to computer resources and telecommunications.

In addition, the terminating equipment may be served by lines as appropriate to the function of the terminating equipment and as necessary for the connection to the public switched telephone network. Such lines may include: LAN administrator line, PBX or switch maintenance lines, desktop modem lines, dial-back up lines, telemetry device lines, dial-up bridges and router's lines, ISDN and voice mail system maintenance lines, and hunt groups and executive hotlines. Advantageously, the present invention provides for communication access restrictions such that the terminating equipment of a subscriber and the lines serving such terminating equipment are protected with respect to a security breach. In particular, the present invention provides protection from "back-door break-ins" by the suspension of communication processing in the telecommunications network pending a determination of the authority of the user in accessing the subscriber's terminating device. The suspension in the telecommunications network guards against back-door break-ins because the communication is isolated in the telecommunications network away from the subscriber's lines, the subscriber's equipment and the subscriber's resources. As noted above in the background, in previous systems, the communication was connected through a subscriber's lines to the subscriber's terminating equipment, and only after such connection, was the communication analyzed with respect to security issues. By that time, a wiley hacker may have already done significant damage.

Referring again to the Advanced Intelligent Network, pursuant to the preferred embodiment, each piece of terminating equipment in an AIN is assigned a directory number. In the description of the present invention, the term "directory number" is used in its generally understood meaning. A "calling party number" or "CgPN" is used herein in its generally understood meaning to be the directory number associated with the calling party, or with the line that connects the calling party's terminating device to the telecommunications network. A "called party number" or "CdPN" is used herein in its generally understood meaning to be the directory number associated with the called party, or with the line that connects the called party's terminating device to the telecommunications network.

Switches 16a, 16b and 16c are interconnected by a plurality of trunk circuits. These are the voice path trunks that interconnect the central office switches to connect communications. The term "communication" is used herein to include all messages or calls that may be exchanged between a calling party and a called party in the system illustrated in FIG. 1 including voice, data and video messages. The term "communication" is used synonymously herein with the term "call" unless a distinction is noted.

Each of the SSPs in the telecommunications network including switches 16a, 16b and 16c are typically connected to a local signal transfer point (STP) 17 via respective data links. These data links employ a signaling protocol referred to as Signaling System 7 (SS7), which is well known to those skilled in the art.

Much of the intelligence of the Advanced Intelligent Network resides in a local service control point (SCP) 24. Typically, an SCP is connected to one or more SSPs through a respective one or more STPs over SS7 data links. For the sake of simplicity, in FIG. 1, SCP 24 is illustrated as connected to STP 17 which is, in turn, connected to end offices 16a, 16b, and 16c over an SS7 data link 26. Among the functions performed by the SCP is the maintenance of network databases which are used in providing telecommunication services. In addition, SCPs typically include databases such as the illustrated subscriber information database 28 that identify particular service subscribers and the services to be accorded to these subscribers.

In the preferred embodiment of the present invention generally depicted in FIG. 1, additional AIN intelligence resides in a service management system (SMS) 30 and related database 32, connected to SCP 24 by an SS7 data link. As will be well known to those skilled in the art, the SMS also is implemented by a large general purpose computer and interfaces to business offices of the local exchange carrier and interexchange carriers. The SMS downloads information to the databases of the SCPs when subscribers set up or modify their ensemble of AIN services. Similarly, the SMS downloads on a non-realtime basis, billing information that is needed in order to appropriately invoice subscribers for the services provided. The SMS includes or also is connected to system administration 33 for the receipt of information, changes to subscriber files, etc. as will be well understood by those skilled in the art.

In the preferred embodiment, an authentication unit 34 is operably connected, integrated or merged with SMS 30 and database 32. As is described in further detail below, the authentication unit is used in the preferred embodiment to apply the communication access restriction (CAR) services of the present invention by the implementation of the security restrictions. Communication access restriction services also are referred to as authentication services herein. In particular, the authentication unit 34 is preferably used in connection with the AIN elements to check whether the caller initiating a communication to a subscriber is an authorized user of the subscriber's resources. Even more particularly, the authentication unit is preferably used to check whether a passcode entered by a calling party corresponds to a passcode that is held at the authentication unit. The preferred authentication unit is the ACE/Server system described in the background and integrated with an SMS 30. Yet more particularly, the preferred authentication unit includes ACE/Server software for passcode authentication and client code for querying the ACE/Server. Further, communications between the authentication unit and the SMS (or other relevant network unit or unit that serves as an access point element) may take place over TCP/IP connections.

Alternatively, the preferred embodiment may provide that the authentication unit 34 is operably connected, integrated or merged with SCP 24 and database 28 for use in the application of CAR services. As yet another alternative, in the preferred embodiment, the authentication unit 34 may be operably be connected, integrated or merged with either the SCP 24 and its database 28 or the SMS 30 and its database 32, and the authentication unit 34 may execute its functions in the application of the described CAR services through communication with the SCP 24, its database 28, the SMS 30 or its database 32. These communications among an authentication unit 34 and other AIN network elements are accomplished in a manner well known to those skilled in the art to apply the described CAR services.

In order to keep the processing of data and calls as simple as possible, a relatively small set of triggers is defined at the switches for each call. A trigger in the Advanced Intelligent Network is an event associated with a particular subscriber line that generates a data packet to be sent to an SCP. The trigger causes the SCP to query its database to determine which customized calling feature or enhanced service should be implemented for this particular call. The results of the database inquiry are sent back to the switch from SCP 24. The return packet includes instructions to the switch as to how to process the call. The instruction may be to take some special action as a result of a customized calling service or enhanced feature. In response to receiving the latter type message, the switch moves through its call states, and generates further call signaling messages that are used to set up and route the call.

As is well known to those skilled in the art, the Advanced Intelligent Network may also include other elements, connections and functions that have not been described herein.

The foregoing description is a basic overview together with a few examples of the operation of the Advanced Intelligent Network that is a modern public switched telephone network. In summary, the AIN is a complex, high-speed, high-traffic-volume packet-switched messaging arrangement that provides a great deal of versatility in the handling of telecommunications.

Overview of the Preferred Embodiment—FIG. 2

The overall preferred process of the present invention is described in connection with the flow chart of FIG. 2. The process is entered at start step 100, and proceeds to step 120 wherein a communication is received. The preferred embodiment of this invention integrates with most, if not all, data applications. Thus, the preferred embodiment includes a silent answer feature (the @dialing command of Hayes compatible modems) and allows a user to enter information such as a PIN and PASSCODE with the CdPN (i.e., ATDT 404-555-1212@PIN, PASSCODE). The silent feature enables the modem to send the information at the proper time for the communication access restriction services of the present invention to work.

Referring again to FIG. 2, at step 140, a check is made to determine whether the communication is to be accorded communication access restriction service. This check is preferably based on whether a communication directed to the called party number (CDPN) is entitled to such service. In other words, the check verifies whether the CdPN is associated with a subscriber who subscribes to CAR services. This check of entitlement is optional. Preferably, this check is carried out in the AIN in the same general manner that other checks for entitlement or subscription to other AIN services are carried out. If the communication is not to be accorded CAR service, then in step 160 the communication is accorded conventional telecommunications service, and the process ends in step 180. On the other hand, if the communication is to be accorded CAR service, then in step 200 the CAR service is applied, and in step 300 a check is made to determine whether the caller is an authorized user of the subscriber's resources. Additional details regarding the preferred determination of a caller as an authorized user are provided below in connection with FIGS. 3A–3C.

If the check step 300 determines that the caller is not an authorized user, then the preferred embodiment includes an optional step of providing the caller with an announcement. In systems that include this optional step, the subscriber may select or even record the announcement that is played to the calling party. In addition, the preferred embodiment may record information associated with the caller and/or the communication so as to provide an audit trail of that communication. The recorded information typically includes calling party number, time and date of the communication. The preferred embodiment may compile the recorded information and provide the subscriber with one or more reports as to the unauthorized callers and/or communications that attempted to access the subscriber's resources through the telecommunications network. For example, a report(s) may be generated with respect to one or more of the following: customer-controlled routing; unauthorized attempt tracking; periodic usage reports; non-authorized caller list; a list of CgPNs of callers that were denied access based on customer selection; average number of successful calls per day; average number of denied calls per month; total number of calls; total number of completed (connected) calls per month; total number of failed calls per month; or total number of denied (failed screening) calls. Further, the system may provide real-time notification on unauthorized attempts to access the resources of the subscriber.

If the check in step 300 is positive in that the calling party is identified as an authorized user, then in step 340 the process establishes a connection of the communication to the subscriber's terminating equipment. By this connection, the authorized user has accessed at least the subscriber's terminating equipment, and possibly, the subscriber's resources. Of course, the subscriber has the option of installing additional security measures to further determine the status of a user after the connection of the communication to the subscriber's terminating equipment.

The preferred process is now described in the context of an example with reference to the Advanced Intelligent Network and to FIG. 1. Assume, for example, that a salesperson ("Kathy") is "on-the-road", and desires to access information in the computer resources of the home office. Kathy uses a portable computer 20b and associated devices to dial-in a communication directed to the CdPN number associated with the host intelligent processor 20g at the home office. The communication is processed through the telecommunications network until it reaches the central office 16c serving the terminating equipment associated with the CdPN at home office 20g. That central office 16c recognizes the presence of a terminating attempt trigger (TAT) with respect to the communication directed to the CdPN. (At the time of subscription, the administrative aspect of the CAR service provides such a trigger) The central office 16c launches a query to SCP 24. In response to the query, the SCP 24 checks its database 28 to determine what type of services, if any, are to be accorded to the communication. In this example, the home office has subscribed to the CAR services of the present invention. The SCP 24 determines that the communication is to be accorded the authentication service, and further inquiry for processing instructions are made to the SMS 30. The SMS 30 checks the authority of the calling party to access the resources of the host 20g by consulting information in an associated database 32 and/or checking or working with an authentication unit 34. Checking the authority of the calling party may involve one or more prompts to the calling party for certain information and comparison of that information to authentication information or records. Referring to our example again, the SMS 30 checks whether Kathy is an authorized user based on information that is provided in association with the communication and based on information that Kathy provides in response to certain prompts. Having determined that Kathy is an authorized user, the SMS 30 provides instructions to the SCP 24 which in turn provides processing instructions or information to the central office 16c to connect the communication to the host 20g. The switch follows the processing information and connects the communication to the host's terminating equipment 20g. Kathy, as an authorized user, has successfully dialed-in to the computer resources of the home office from a remote location.

In the foregoing example, the SCP 24 initially determined whether the communication was to be accorded authentication service. Those skilled in the art will understand that this determination may be made by a different network element equipped with the appropriate functionality and database. For example, a service circuit node (SCN) or even a switch may undertake this determination. Alternatively, this determination may be carried out by the SMS 30 or the authentication unit 34. Similarly, application of the CAR service, and in particular, determination of whether the calling party is an authorized user also may be carried out by a network element other than the SMS 30 or authentication unit 34. For example, a switch, service control point, or a service circuit node may be equipped to be used for these functions.

Set Up and Administration of the Authentication Service

Those skilled in the art will understand the methods and systems by which subscribers to AIN services may provide and update information to the service provider with respect to the set up and alteration to such subscriber AIN services. These well known methods and systems are applicable to the set up and changes in the information necessary to implement the present invention for any particular subscriber. Generally, a subscriber provides the necessary set up information or change information to a representative of the service provider by calling into an SMS using a VT 100 terminal emulator or another access method. The representative (or caller) then enters the pertinent information into the system as appropriate so that the subscriber receives specified services. In some cases, a subscriber also may input or change some of this information himself or herself through the use of an administrative service provided by the service provider. For example, a subscriber may input or change some of this AIN service information by way of a call to a VT 100 system. The subscriber typically provides information in response to prompts.

Figure 3B:
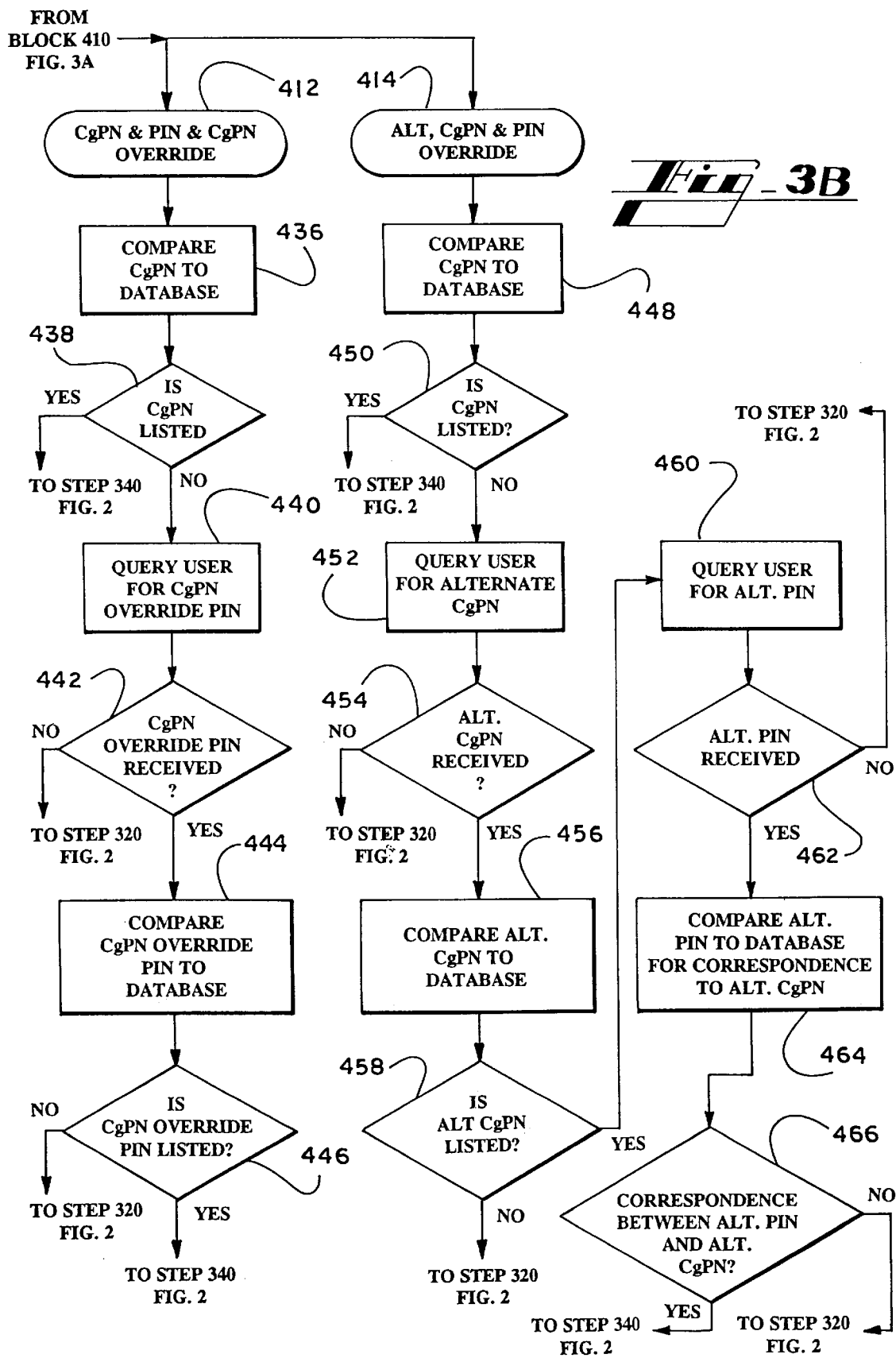

Pursuant to the preferred embodiment, a subscriber to communications access restriction services may selectively identify the type of authentication service to be implemented. Of course, the subscriber also has to provide information regarding authorized users as necessary based on the type of authentication service to be implemented. This information may be stored by the service in tables, databases, a server, etc. as necessary to accomplish the functions of the present invention. FIGS. 3A–3C illustrate ten different authentication features, and these features are discussed in further detail in the discussion below of FIGS. 3A–3C. In the immediately following paragraphs, a general discussion of these ten different authentication features is provided.

CgPN Service

One of the ten authentication features is referred to herein as the CgPN service. Specifically, the subscriber may choose to screen incoming calls based solely on the calling party number (CgPN). In other words, access would be granted so long as a calling party was attempting to access a subscriber's resources from a telephone number which had been previously designated by the subscriber to the system as a CgPN corresponding to an authorized user. Typically, the system stores such information in a database such as a table, list or database associated with an SCP 24, an SMS 30 or an authentication unit 34.

Network PIN Service

Another authentication feature is referred to herein as the network PIN service. This network PIN service may be established by a subscriber as an accommodation to authorized users who might be calling from remote locations whose telephone numbers are unknown in advance (and, therefore, not readily subject to programming in a database). Access can be controlled solely by a personal identification number (PIN). A PIN, typically consisting of four to ten digits, can either be initially selected by the user or determined by the subscriber. Once issued, the PIN is provided by the subscriber to the system as a means of identifying an authorized user. As with the CgPN, the PIN is typically entered into a database for reference with respect to the authorization of a user in accessing a subscriber's resources.

In this network PIN service, upon receipt of an attempted communication, a prompt directs the calling party to enter a PIN. A prompt may be silent, dialtone or otherwise. A "prompt" may include an announcement to the calling party to provide certain information. A "silent" prompt is typically an interval of time without an announcement that allows a user to enter information. A silent prompt is considered an additional layer of security restriction in the sense that a calling party that is unfamiliar with the authentication service (such as a hacker or other unauthorized user) will not generally recognize the interval of silence for what it is, i.e., an interval for the entry of information. Thus, the unauthorized user will not provide information during the interval, and will not be authorized to access the subscriber's resources. Following entry of a PIN, an authentication or verification is conducted with respect to the entered PIN. Typically, a comparison is performed regarding the entered PIN to a list of PINs corresponding to authorized users maintained in a relevant database. A match between an entered PIN and a PIN database entry results in termination of the communication to the subscriber's terminating equipment. In such a PIN-only system, access to computer resources may be achieved by anyone using a PIN initially assigned to an authorized user and subsequently maintained in a related database. However, this is a convenient system for many subscribers.

Combinations of CgPN & Network PIN Features

A subscriber may also select various combinations of the CgPN-only and PIN-only restriction systems so as to better safeguard the subscriber's resources with added layers of security restrictions. One such combination would be a PIN override of a CgPN. In this scenario, a caller whose CgPN was not listed in the comparison database could override this failure by entering a matching PIN. Another such combination would require both CgPN and PIN to match before allowing access. Failure to match either CgPN or PIN would result in a disconnection.

Authorized users may have more than one authorized CgPN (and corresponding PIN) in the database for the purpose of facilitating system access from alternate locations such as home or office. So, another combination of the CgPN-only and PIN-only restriction systems may be particularly attractive to some subscribers. Such an option would allow a calling party access to the system even if the calling party is required to match both CgPN and PIN, but yet is initiating the communication from a telephone number unknown to the subscriber's database. This access would be accomplished by the entry of certain override information. After failing the CgPN portion of the comparison, a prompt could be generated (silent or otherwise) directing the calling party to enter an alternate CgPN and corresponding PIN, or an alt PIN (if an alt CgPN was used). Successful entry of this information would allow access to the subscriber's resources.

An additional variation of the previous configuration would require the subscriber to issue a special override PIN. Such an override PIN would only be used in situations where an alternate CgPN was being used to override an unauthorized CgPN from a location other than that to which the alternate CgPN had been assigned. This special override PIN would not be used to allow access under any other circumstances.

Passcode Inclusive Features

Pursuant to the preferred embodiment of the present invention, a subscriber may choose one of four authentication services or features that include the authentication of a passcode provided by the calling party. As with the other services described above, this choice may be by CdPN or line so that a subscriber may have a first type of CAR service or authentication feature on a first CdPN line, a second type on another line, etc. In this manner, a subscriber may vary the level of difficulty in the accessibility to a resource by calling line number.

In general, the passcode authentication features are generally more restrictive as access system configurations than the CgPN, PIN, etc. features described in the paragraphs immediately above. The passcode authentication features are generally more restrictive than the other features because it is much more unlikely that an unauthorized user has an authorized passcode given the passcode authentication features described below.

All of the passcode authentication features include an authentication of a passcode provided by the calling party prior to connecting the communication to the terminating device associated with the subscriber. To implement these passcode features of the preferred embodiment, a subscriber provides an authorized user with a token. The authorized user uses the token to obtain a passcode, which is entered by the user when the user seeks remote access through a communication to a subscriber's resources. The passcode features of the present invention are preferably implemented through the use of an authentication unit 34 in association with or integrated with an element of the advanced intelligent network (such as the SMS 30, SCP 24 or SCN). Thus, when a communication is received from the calling party and is directed to the subscriber, the preferred embodiment checks whether the passcode is authentic in a manner described in greater detail below in connection with FIG. 3C. Generally, the passcode is considered to be authentic if it corresponds to information such as a passcode that is held at the authentication unit 34. Of course, other authentication measures may be taken in the telecommunications network as will be described below to make sure that the calling party is an authorized user prior to connecting the communication to the terminating equipment of the called party. Further, it should be noted that those readers seeking further information with respect to the use of a token system for the provision of a passcode may consult the background section, supra.

In the preferred embodiment, the authorization of a user through the use of a passcode to connect through a communication (voice or data) to a subscriber's resources is checked based on a single layer of security restrictions, one of two different double layer of security restrictions, or a triple layer of security restrictions. All of these layers include the use of a passcode, and preferably, a passcode from a token used by the calling party. The single layer includes a check to determine whether the passcode received from the calling party corresponds to information or a passcode held by the network through its CAR service implementation. For example, in this single layer system, a passcode entered by the calling party is compared to certain information. The passcode may be entered without prompts, in response to a single prompt or separate prompts (silent, dialtone or otherwise). In the preferred embodiment, the calling party uses the token to determine the passcode at the time of the calling party's attempt to communicate with the subscriber's resources. Preferably, the calling party reads the passcode from a display on the token and enters the passcode in response to some prompt. Depending on the type of passcode system used, the passcode may include an embedded PIN even in this single layer of authentication.

Pursuant to this preferred embodiment, the single layer of the authentication service includes a network-based service of checking the received passcode against information such as authorized passcode entries maintained by the CAR service. In the preferred embodiment, the CAR service implementation includes an authentication unit that is a communication access server, such as the ACE/Server described in the background of the invention. This authentication unit contains and maintains in the telecommunications network information that corresponds to the passcodes generated by the token that allows for authentication of the passcode entered by the user. The containment and maintenance of this passcode information in the telecommunications network is seen to have several advantages. First, the telecommunications network provides a centralized system of containment and maintenance such that a subscriber does not have to own and maintain such devices or maintain such information. Further, the subscriber does not have to train employees or retain others to set up and maintain this information. The subscriber simply calls into the system to set up and/or change the information. Further, the centralized system maintains the security of the information, and takes the job of taking care of that security away from the subscriber. In addition, the centralized system prevents an unauthorized communication from even being connected to a subscriber's terminating device, thereby, significantly increasing the security of the subscriber's resources by preventing an unauthorized communication from connecting to a subscriber's resources.

Referring again to the description of the preferred operation of this single layer embodiment, in particular, an authentication unit checks whether the received passcode corresponds to a passcode that is generated at the authentication unit. Preferably, the passcode generated by the token is synchronous with the passcode maintained by the network. In this single layer service, the entry of a matching passcode by the calling party allows a communication to be connected to the subscriber's terminating device, and thereby, may provide access to the resources of the subscriber. Failure to enter information corresponding to an authorized passcode preferably results in rejection of the communication.

As noted above, the preferred embodiment offers a subscriber a choice in double layers of authentication services. One of the double layers includes the authentication of a user based on the network PIN system and based on the single layer passcode comparison described above. For example, in this PIN/passcode double layer system, a PIN entered by the calling party is compared to entries in a database AND a passcode entered by the calling party is compared to certain information. The PIN and the passcode may be entered without prompts, in response to a single prompt or separate prompts (silent, dialtone or otherwise).

The other of the double layers includes the authentication of a user based on calling line number (CgPN) and based on the single layer passcode comparison described above. For example, in this CgPN/passcode double layer system, a CgPN associated with a communication is compared to entries in a database and a passcode entered by the calling party is compared to certain information. The CgPN may be read as will be understood by those skilled in the art, or may be input by the calling party.

It should be noted that the doubler layer services (and the triple layer serve as described below) may be altered to take into account other security features. For example, a subscriber may allow a calling party to override a CgPN with an alternate CgPN in order to gain access to the subscriber's resources. In addition, a subscriber may allow a calling party access to the subscriber's resources if the calling party provides an alternate CgPN with a PIN that corresponds to that alternate CgPN. Some of these features have been described above in connection with the non-passcode authentication features.

The triple layer of security restrictions is essentially a combination of the two double layers of security features. This triple layer includes authentication of a PIN, a CgPN and a passcode, as described above. Thus, in the triple layer system, information from a calling party must correspond to an authorized passcode, an authorized PIN and an authorized CgPN in order for the communication from the calling party to be connected to the terminating device of the subscriber.

Those skilled in the art will understand that with respect to either of the double layers or the triple layer of authentication services, the order of the steps for authentication of a passcode, PIN and/or CgPN is irrelevant. In other words, an authentication service may be configured so that a calling party must enter a passcode from a token as the first step in the either of the double layer or in the triple layer of the preferred authentication process.

Details of the Preferred Communication Access Restriction Service—FIGS. 3A–3C

FIGS. 3A–3C illustrate additional details with respect to the possibilities in the application of the preferred communication access restriction service of the present invention and in checking the authorization of a user as noted generally in the process flow diagram illustrated in FIG. 2, and in particular, at steps 200 and 300. FIGS. 3A–3C are entered from step 140 (yes), FIG. 2, at step 400 in FIG. 3A. A subscriber may opt for basic or premium service for any of the subscriber's respective CgPNs or lines.

Basic Service—FIGS. 3A and 3B

If a subscriber opts for basic service, then in step 402 a subscriber may choose features including one of six authentication services: (1) CgPN 404; (2) PIN 406; (3) CgPN & PIN override 408; (4) CgPN & PIN 410; (5) CgPN & PIN & CgPN override 412; and (6) ALT. CgPN & PIN override. Generally, each of these authentication services are carried out in the SCP 24, which includes a database that may be supplied with the relevant programming and subscriber information. But these services may be carried out in a different network element such as the SMS or a SCN as provided with the relevant programming and a database that is supplied with the relevant subscriber information. Alternatively, the authentication unit 34 may be queried by any of these network elements to check the authority of the calling party where the authentication unit is supplied with the relevant programming and a database with the relevant subscriber information.

Pursuant to the CgPN 404 service, the CgPN of a communication is compared in step 416 to entries in a database and in step 418 a check is made to determine whether the CgPN is listed or otherwise corresponds to an authorized user. If not, then the process proceeds to optional step 320 and then to the end step 180 of FIG. 2. If the CgPN is listed thereby indicating an authorized user, the process proceeds to step 340 of FIG. 2 to establish a connection to the subscriber's terminating equipment.

Pursuant to the PIN 406 service, the process queries the calling party (user) for a PIN. This may be accomplished by a prompt (silent or otherwise). Alternatively, the PIN may be received without any prompts from the process being provided. Such an alternative is especially likely to be provided in the access attempts involved with data communications. In step 422 a check is made to determine whether a PIN has been received. If not, then the process proceeds to optional step 320 and then to the end step of 180 of FIG. 2. If a PIN has been received, then the PIN is compared in step 424 to entries in a database and in step 426 a check is made to determine whether the PIN is listed or otherwise corresponds to an authorized user. If not, then the process proceeds to optional step 320 and then to the end step 180 of FIG. 2. If the PIN is listed thereby indicating an authorized user, the process proceeds to step 340 of FIG. 2 to establish a connection to the subscriber's terminating equipment.

The CgPN & PIN override service 408 provides the calling party with an opportunity to provide proof of authorization through the use of a PIN even if the CgPN is incorrect. Pursuant to the CgPN & PIN override service, the CgPN of a communication is compared in step 428 to entries in a database and in step 430 a check is made to determine whether the CgPN is listed or otherwise corresponds to an authorized user. If the CgPN is listed thereby indicating an authorized user, the process proceeds to step 340 of FIG. 2 to establish a connection to the subscriber's terminating equipment. If the CgPN is not listed, then the process proceeds to step 420 wherein the process queries the calling party (user) for a PIN and then follows the process as described above in the PIN service 406. Alternatively, this PIN may be received without any prompts from the process being provided. Such an alternative is especially likely to provided in the access attempts involved with data communications.

The CgPN & PIN service 410 requires the calling party to use an authorized CgPN and to provide an authorized PIN in order to gain connection to the subscriber's terminating device. Pursuant to the CgPN & PIN service 410, the CgPN of a communication is compared in step 432 to entries in a database and in step 434 a check is made to determine whether the CgPN is listed or otherwise corresponds to an authorized user. If not, then the process proceeds to optional step 320 and then to the end step 180 of FIG. 2. If the CgPN is listed thereby indicating an authorized user, the process proceeds to step 420 wherein the process queries the calling party (user) for a PIN and then follows the process as described above in the PIN service 406. Alternatively, this PIN may be received without any prompts from the process being provided. Such an alternative is especially likely to provided in the access attempts involved with data communications.

FIG. 3B illustrates the CgPN & PIN & CgPN override service 412, which provides the calling party with an opportunity to provide proof of authorization through the use of an CgPN override even if the CgPN is incorrect. Pursuant to this service, the CgPN of a communication is compared in step 436 to entries in a database and in step 438 a check is made to determine whether the CgPN is listed or otherwise corresponds to an authorized user. If the CgPN is listed thereby indicating an authorized user, the process proceeds to step 340 of FIG. 2 to establish a connection to the subscriber's terminating equipment. If the CgPN is not listed, then the process proceeds to step 440 wherein the process queries the calling party (user) for a CgPN override PIN. This may be accomplished by a prompt (silent or otherwise). Alternatively, this PIN may be received without any prompts from the process being provided. Such an alternative is especially likely to provided in the access attempts involved with data communications. In step 442 a check is made to determine whether a CgPN override PIN has been received. If not, then the process proceeds to optional step 320 and then to the end step of 180 of FIG. 2. If a CgPN override PIN has been received, then the PIN is compared in step 444 to entries in a database and in step 446 a check is made to determine whether the CgPN override PIN is listed or otherwise corresponds to an authorized user. If not, then the process proceeds to optional step 320 and then to the end step 180 of FIG. 2. If the CgPN override PIN is listed thereby indicating an authorized user, the process proceeds to step 340 of FIG. 2 to establish a connection to the subscriber's terminating equipment.

FIG. 3B also illustrates the Alt. CgPN & PIN override service 414, which provides the calling party with an opportunity to provide proof of authorization through use of an alternate CgPN even if the CgPN is incorrect. However, the subscriber is further protected by an added security restriction in that an ALT CgPN is accepted as proof of authorization only if the calling party also enters an alternate PIN that corresponds to the Alt. CgPN. Pursuant to this service, the CgPN of a communication is compared in step 448 to entries in a database and in step 450 a check is made to determine whether the CgPN is listed or otherwise corresponds to an authorized user. If the CgPN is listed thereby indicating an authorized user, the process proceeds to step 340 of FIG. 2 to establish a connection to the subscriber's terminating equipment. If the CgPN is not listed, then the process proceeds to step 452 wherein the process queries the calling party (user) for an alternate CgPN. This may be accomplished by a prompt (silent or otherwise). Alternatively, this PIN may be received without any prompts from the process being provided. Such an alternative is especially likely to provided in the access attempts involved with data communications. In step 454 a check is made to determine whether an alternate CgPN has been received. If not, then the process proceeds to optional step 320 and then to the end step of 180 of FIG. 2. If an alternate CgPN has been received, then the alternate CgPN is compared in step 456 to entries in a database and in step 458 a check is made to determine whether the alternate CgPN is listed or otherwise corresponds to an authorized user. If not, then the process proceeds to optional step 320 and then to the end step 180 of FIG. 2.

If the alternate CgPN is listed thereby indicating an authorized user, the process proceeds to step 460 wherein the process queries the calling party (user) for an alternate PIN. This may be accomplished by a prompt (silent or otherwise). Alternatively, this PIN may be received without any prompts from the process being provided. Such an alternative is especially likely to provided in the access attempts involved with data communications. In step 462 a check is made to determine whether an alternate PIN has been received. If not, then the process proceeds to optional step 320 and then to the end step of 180 of FIG. 2. If an alternate PIN has been received, then the alternate PIN is compared in step 464 to entries in a database and preferably is compared for correspondence with the alternate CgPN. In step 466 a check is made to determine whether the alternate PIN is listed and preferably, whether the alternate PIN corresponds to the alternate CgPN or otherwise corresponds to an authorized user. If not, then the process proceeds to optional step 320 and then to the end step 180 of FIG. 2. If the check step 466 is positive thereby indicating an authorized user, the process proceeds to step 340 of FIG. 2 to establish a connection to the subscriber's terminating equipment.

Premium Service—FIG. 3C

As noted above in connection with step 400 of FIG. 3A, pursuant to the preferred embodiment, the subscriber may opt for basic service or premium service. If the subscriber opts for premium service, then in step 470 a subscriber may choose features including one of four authentication services: (1) CgPN & PIN & PASSCODE 472 service (also referred to as the "triple layer" described generally above); (2) PIN & PASSCODE 473 service (also referred to as one of the "double layer" described generally above); (3) PASSCODE 474 service (also referred to as the "single layer" described) and (4) CgPN & PASSCODE 474 service (also referred to as one of the "double layer" described generally above). Generally, the passcode authentication of these four features is preferably carried out in the AIN through an exchange of information between an AIN element (such as SMS or SCP) and the authentication unit 34. The other aspects of these premium services (CgPN and PIN) may be carried out in the same manner (i.e., an exchange of information between an AIN element and the authentication unit). However, these other aspects (CgPN and PIN) generally are carried out in the relevant AIN network element. Further, it will be apparent to those skilled in the art that all aspects of these premium services may be carried out in an AIN element that is provided with the appropriate functionality and information.

Pursuant to the CgPN & PIN & PASSCODE 472 service, the CgPN of a communication is compared in step 476 to entries in a database and in step 478 a check is made to determine whether the CgPN is listed or otherwise corresponds to an authorized user. If not, then the process proceeds to optional step 320 and then to the end step 180 of FIG. 2. If the CgPN is listed thereby indicating an authorized user, the process proceeds to step 480 wherein the process queries the calling party (user) for a PIN. This may be accomplished by a prompt. Alternatively, this PIN may be received without any prompts from the process being provided. Such an alternative is especially likely to provided in the access attempts involved with data communications. In step 482 a check is made to determine whether a PIN has been received. If not, then the process proceeds to optional step 320 and then to the end step of 180 of FIG. 2. If a PIN has been received, then the PIN is compared in step 484 to entries in a database and in step 486 a check is made to determine whether the PIN is listed or otherwise corresponds to an authorized user. If not, then the process proceeds to optional step 320 and then to the end step 180 of FIG. 2.

After a confirmation that the CgPN and the PIN correspond to an authorized user, the preferred embodiment provides an additional layer of security restrictions by an authentication of a passcode that is provided by the calling party. As noted generally above, it is preferred that the calling party provide a passcode that is generated by a token such as the SecurID token described generally in the background of the invention. Thus, after step 486 (yes), in step 488 the process queries the calling party (user) for a PASSCODE. This may be accomplished by a prompt (silent, dialtone or otherwise). Alternatively, this passcode may be received without any prompts from the process being provided. Such an alternative is especially likely to provided in the access attempts involved with data communications. In step 490 a check is made to determine whether a PASSCODE has been received. If not, then the process proceeds to optional step 320 and then to the end step of 180 of FIG. 2. If a PASSCODE has been received, then the PASSCODE is compared in step 492 to entries in a database and in step 494 a check is made to determine whether the PASSCODE is listed or otherwise corresponds to an authorized user. As noted, this comparison and check are preferably conducted by the authentication unit 34. If not, then the process proceeds to optional step 320 and then to the end step 180 of FIG. 2. If the PASSCODE is correct, thereby indicating an authorized user, the process proceeds to step 340 of FIG. 2 to establish a connection to the subscriber's terminating equipment.

Pursuant to the PIN & PASSCODE 473 service, the calling party only has to provide an authorized PIN and an authorized PASSCODE in order to gain a connection of a communication to a subscriber's terminating equipment, and thereby, to gain access to a subscriber's resources. This double layer system allows a calling party to skip the CgPN authentication steps in order to allow the calling party to dial-in to the subscriber's resources from any calling line. This provides the subscriber and its calling parties with greater flexibility than the triple layer system described above in connection with the CgPN & PIN & PASSCODE 472 service. Yet, the double layer system safeguards the subscriber's resources through the PIN and PASSCODE authentication steps. Thus, the double layer system skips the CgPN steps 476–478, and proceeds with the PIN steps of 480–486 and the PASSCODE steps of 488–494.

Pursuant to the PASSCODE 474 service, the calling party only has to provide an authorized PASSCODE in order to gain a connection of a communication to a subscriber's terminating equipment, and thereby, to gain access to a subscriber's resources. This single layer system allows a calling party to skip the CgPN and PIN authentication steps in order to allow the calling party to dial-in to the subscriber's resources from any calling line and without the entry of a PIN. This provides the subscriber and its calling parties with greater flexibility than the double or triple layer systems described above. Yet, the double layer system safeguards the subscriber's resources through the PASSCODE authentication steps. Thus, the single layer system skips the CgPN steps 476–478, skips the PIN steps 480–486, and proceeds with the PASSCODE steps of 488–494.

Pursuant to the CgPN & PASSCODE 475 service, the calling party only has to provide or call from an authorized CgPN and to provide an authorized PASSCODE in order to gain a connection of a communication to a subscriber's terminating equipment, and thereby, to gain access to a subscriber's resources. This double layer system allows a calling party to skip the PIN authentication steps in order to allow the calling party to dial-in to the subscriber's resources from any calling line. This provides the subscriber and its calling parties with greater flexibility than the triple layer system described above in connection with the CgPN & PIN & PASSCODE 472 service. Yet, the double layer system safeguards the subscriber's resources through the CgPN and PASSCODE authentication steps. Thus, this double layer system includes the CgPN steps 476–478 (indicated as steps 476' and 478' for ease of reference), but skips the PIN steps 480–486, and proceeds with the PASSCODE steps of 488–494.

From the foregoing description, it will be appreciated that the various embodiments of the present invention meet the objects stated above. From the foregoing description of alternate embodiments of the present invention, other embodiments will suggest themselves to those skilled in the art. Therefore, the present invention should be limited only by the claims below and equivalents thereof.

I hereby claim:

1. A network-based telecommunications system for restricting the dial-in access to a resource of a subscriber to only a communication from an authorized user of said resource, comprising:

a. a plurality of network switches;

b. a network authentication unit functionally connected to each of said plurality of network switches;

c. said each of said plurality of network switches being operative
　　to receive a communication directed to said resource of said subscriber,
　　to pause in the network processing of said communication prior to connecting said communication to the terminating equipment associated with said resource of said subscriber to issue a silent prompt, to receive a calling party passcode in response to said silent prompt, and to make a request of said network authentication unit for processing information with respect to said communication;

d. said network authentication unit being responsive to said request from a network switch of said plurality of network switches to generate a selected unit passcode, said selected unit passcode being one of a plurality of passcodes that are periodically generated by said network authentication unit, to make a determination as to whether said calling party passcode was generated in synchronicity with said selected unit passcode, and based on said determination to provide said processing information with respect to said communication to said network switch; and e. said network switch being further operative in response to receipt of said processing information to continue said network processing of said communication.

2. The system of claim 1, wherein said determination is that said calling party passcode was generated in synchronicity with said selected unit passcode;

wherein said processing information comprises connection instructions to process said communication to terminating equipment associated said resource of said subscriber; and wherein said network switch is further operative in response to receipt of said connection instructions to continue said network processing of said communication by processing said communication to said terminating equipment associated with said resource of said subscriber.

3. The system of claim 1, wherein said determination is that said calling party passcode was not generated in synchronicity with said selected unit passcode;

wherein said processing information comprises announcement instructions; and wherein said network switch is further operative in response to receipt of said announcement instructions to provide said communication with an announcement.

4. The system of claim 1, wherein said determination is that said calling party passcode was not generated in synchronicity with said selected unit passcode;

wherein said processing information comprises instructions not to connect said communication to said terminating equipment associated with said resource of said subscriber; and wherein said network switch is further operative in response to receipt of said instructions to not connect said communication to said terminating equipment associated with said resource of said subscriber.

5. The system of claim 4, wherein said network authentication unit is operative in conjunction with said network switch to provide an audit trail with respect to said communication.

6. The system of claim 5, wherein said audit trail further comprises a calling party number associated with said communication, the time of receipt of said communication, or the date of receipt of said communication.

7. The system of claim 4, wherein said network authentication unit is operative in conjunction with said network switch to provide a report with respect to said communication to said subscriber, said report including information relating to said communication, said information comprising:

customer-controlled routing information;
unauthorized attempt tracking information;
a periodic usage report; or
a non-authorized caller list.

8. The system of claim 4, wherein said network authentication unit is operative in conjunction with said network switch to provide a real-time notification regarding said communication, said real-time notification providing notice of an unauthorized attempt to access said resource of said subscriber.

9. The system of claim 1, wherein said network switch is further operative while pausing in said network processing of said communication to make a communication access restriction (CAR) service determination as to whether said communication is directed to a called party number that is entitled to a communication access restriction (CAR) service.

10. The system of claim 9, wherein said CAR service determination is that said communication is not directed to said called party number that is entitled to said CAR service, and wherein said network switch is further operative to provide conventional network telecommunications service to said communication.

11. The system of claim 1, further comprising a token that generates said calling party passcode, said calling party token being used by a user associated with said communication to provide said network switch with said calling party passcode.

12. The system of claim 11, wherein said calling party passcode further comprises a personal identification number of said user;

wherein said network authorization unit stores a plurality of personal identification numbers; and wherein said network authorization unit is further operative to check whether said personal identification number of said user corresponds to one of said plurality of personal identification numbers.

13. The system of claim 1, wherein said network authorization unit stores a plurality of authorized calling line numbers;

wherein said network switch is further operative to provide said network authorization unit with the calling line number associated with said communication as part of said request of said network authentication unit for said processing information; and wherein said network authorization unit is further operative to make a comparison as to whether said calling line number corresponds to one of said plurality of authorized calling line numbers, and to provide said processing information with respect to said communication to said network switch based on said comparison.

14. In a network-based telecommunications system including a plurality of network switches with each of said plurality of network switches being functionally connected to a network authentication unit, a network method to restrict the dial-it access to a resource of a subscriber to only a communication from an authorized user of said resource, comprising the steps of:

A. receiving a communication at a network switch of said plurality of network switches in said network-based telecommunications system for network processing of said communication from a user to terminating equipment associated with said resource of said subscriber;

B. after receiving said communication, but prior to establishing a connection for said communication to said terminating equipment associated with said resource of said subscriber, causing said network switch to pause in said network processing of said communication based on a called party number associated with said communication;

C. while pausing, making a determination as to whether said communication directed to said called party number is entitled to a communication access restriction (CAR) service; and D. if said determination in step C is that said communication is entitled to said CAR service, then causing said network authentication unit to provide said CAR service by:

i. providing a silent prompt for a calling party passcode to said communication, ii. if said calling patty passcode is provided in response to said silent prompt, then checking whether said calling party passcode corresponds to a selected unit passcode by determining whether said calling party passcode was generated in synchronicity with said selected unit passcode, and iii. if said calling party passcode corresponds to said selected unit passcode, then continuing said network processing of said communication so as to establish said connection of said communication with said terminating equipment associated with said resource of said subscriber, whereby said authorized user is provided with said dial-in access to said resource of said subscriber.

15. The method of claim 14, further comprising the step of providing conventional network telecommunications service to said communication, if said determination in step C is that said communication is not entitled to said CAR service.

16. The method of claim 14, further comprising the step of providing conventional network telecommunications service to said communication, if said calling party passcode fails to be provided in response to said silent prompt provided in step D(i).

17. The method of claim 14, further comprising the step of providing conventional network telecommunications service to said communication, if said calling party passcode fails to correspond to said selected unit passcode as checked in step D(ii).

18. The method of claim 14, further comprising the step of generating an audit trail with respect to said communication, said audit trail comprising the calling party number associated with said communication, the time of receipt of said communication, or the date of receipt of said communication.

19. The method of claim 18, further comprising the step of providing said audit trail to said subscriber.

20. The method of claim 14, further comprising the step of generating a report with respect to said communication, said report including information relating to said communication, said information comprising:

customer-controlled routing information;

unauthorized attempt tracking information;

a periodic usage report; or a non-authorized caller list.

21. The method of claim 14, further comprising the step of providing a real-time notification regarding said communication, said real-time notification providing notice of an unauthorized attempt to access said resource of said subscriber.

22. The method of claim 14, further comprising the step of providing a token that generates said calling party passcode, said token being used by a user associated with said communication to provide said calling party passcode.

23. The method of claim 14, wherein said calling party passcode comprises a personal identification number;

wherein said step of providing said CAR service further comprises the step of checking whether said personal identification number corresponds to one of said plurality of personal identification numbers; and wherein said step D(iii) of continuing said network processing if said calling party passcode corresponds to said selected unit passcode further comprises:

if said personal identification number corresponds to said one of said plurality of personal identification numbers, then continuing said network processing of said communication so as to establish said connection of said communication with said terminating equipment associated with said resource of said subscriber.

24. The method of claim 14, wherein said step of providing said CAR service further comprises the step of checking whether the calling line number associated with said communication corresponds to one of a plurality of authorized calling line numbers; and wherein said step D(iii) of continuing said network processing if said calling party passcode corresponds to said selected unit passcode further comprises:

if said calling line number associated with said communication corresponds to said one of said plurality of authorized calling line numbers, then continuing said network processing of said communication so as to establish said connection of said communication with said terminating equipment associated with said resource of said subscriber.

25. A network-based telecommunications system for restricting the dial-in access to a resource of a subscriber to only a communication from an authorized user of said resource, comprising:

a. a token that generates a calling party passcode, said token being used by a user in association with a communication to provide said calling party passcode;

b. a plurality of network switches, each network switch of said plurality of network switches being operative to receive a communication directed to said resource of said subscriber, to pause in the network processing of said communication prior to connecting said communication to the terminating equipment associated with said resource of said subscriber to issue a silent prompt, to receive said calling party passcode from said user in connection with said communication, and to make a request for processing information with respect to said communication; and c. a network authentication unit, said network authentication unit functioning as part of said telecommunications system and functionally connected to said each network switch of said plurality of network switches, said network authentication unit including a plurality of unit passcodes, said network authentication unit being responsive to a request from said network switch to make a determination that said user is said authorized user if said calling party passcode corresponds to a selected one of said unit passcodes by checking whether said calling party passcode was generated in synchronicity with said selected unit passcode, and based on said determination, to provide said processing information with respect to said communication to said network switch, said processing information including connection instructions to connect said communication to said terminating equipment of said subscriber, whereby said authorized user is provided with said dial-in access to said resource of said subscriber.

* * * * *